US012770788B2

(12) United States Patent
Fujikawa

(10) Patent No.: US 12,770,788 B2
(45) Date of Patent: Oct. 20, 2026

(54) MULTILAYER CERAMIC ELECTRONIC COMPONENT

(71) Applicant: KYOCERA Corporation, Kyoto (JP)

(72) Inventor: Nobuyoshi Fujikawa, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 112 days.

(21) Appl. No.: 18/717,270

(22) PCT Filed: Dec. 6, 2022

(86) PCT No.: PCT/JP2022/044992
§ 371 (c)(1),
(2) Date: Jun. 6, 2024

(87) PCT Pub. No.: WO2023/120173
PCT Pub. Date: Jun. 29, 2023

(65) Prior Publication Data

US 2025/0037935 A1 Jan. 30, 2025

(30) Foreign Application Priority Data

Dec. 23, 2021 (JP) ................................ 2021-209894

(51) Int. Cl.
*H01G 4/12* (2006.01)
*H01G 4/008* (2006.01)
*H01G 4/30* (2006.01)

(52) U.S. Cl.
CPC ......... *H01G 4/1227* (2013.01); *H01G 4/0085* (2013.01); *H01G 4/30* (2013.01)

(58) Field of Classification Search
CPC ........ H01G 4/012; H01G 4/30; H01G 4/0085; H01G 4/1227
See application file for complete search history.

(56) References Cited

U.S. PATENT DOCUMENTS

| | | | | |
|---|---|---|---|---|
| 2004/0090721 A1* | 5/2004 | Nagai | ...................... | H01C 1/14 361/15 |
| 2011/0075318 A1* | 3/2011 | Suzuki | ..................... | H01C 7/18 156/89.16 |
| 2020/0357573 A1 | 11/2020 | Morita | | |

FOREIGN PATENT DOCUMENTS

| | | | | | |
|---|---|---|---|---|---|
| JP | 03-119608 | A | | 5/1991 | |
| JP | H05109318 | A | * | 4/1993 | ......... C04B 35/4686 |
| JP | 2002-217055 | A | | 8/2002 | |
| JP | 2010258028 | A | * | 11/2010 | |
| JP | 2014165447 | A | * | 9/2014 | |
| JP | 2020-184587 | A | | 11/2020 | |

* cited by examiner

*Primary Examiner* — David M Sinclair
(74) *Attorney, Agent, or Firm* — Volpe Koenig

(57) ABSTRACT

A multilayer ceramic electronic component includes a stack including dielectric layers and internal electrode layers alternately stacked on one another. The dielectric layers include $1.1\times10^{14}$ to $6.1\times10^{14}$ oxygen vacancies/$mm^3$ inclusive.

4 Claims, 3 Drawing Sheets

MULTILAYER CERAMIC ELECTRONIC COMPONENT

TECHNICAL FIELD

The present disclosure relates to a multilayer ceramic electronic component.

BACKGROUND OF INVENTION

A known technique for multilayer ceramic electronic components is described in, for example, Patent Literature 1.

CITATION LIST

Patent Literature

Patent Literature 1: Japanese Unexamined Patent Application Publication No. 2020-184587

SUMMARY

In an aspect of the present disclosure, a multilayer ceramic electronic component includes a stack including dielectric layers and internal electrode layers alternately stacked on one another. The dielectric layers include $1.1\times10^{14}$ to $6.1\times10^{14}$ oxygen vacancies/$mm^3$ inclusive.

BRIEF DESCRIPTION OF THE DRAWINGS

The objects, features, and advantages of the present disclosure will become more apparent from the following detailed description and the drawings.

DESCRIPTION OF EMBODIMENTS

The structure that forms the basis of a multilayer ceramic electronic component according to one or more embodiments of the present disclosure will be described first.

Recent small and sophisticated electronic devices and electronic components incorporated in such electronic devices are to be smaller and more sophisticated. Multilayer ceramic capacitors, which are examples of multilayer ceramic electronic components, are to be smaller and have larger capacity.

Such a multilayer ceramic capacitor may include thinner dielectric layers to be smaller and have larger capacity. However, thinner dielectric layers are more likely to cause short-circuiting between internal electrode layers with different polarities (hereafter also simply referred to as short-circuiting), thus possibly lowering the reliability of the multilayer ceramic capacitor. Patent Literature 1 describes a technique for determining the ratio between a low-temperature peak current value and a high-temperature peak current value of a thermally stimulated depolarization current to improve the reliability of a multilayer ceramic capacitor.

Known multilayer ceramic capacitors may have partial thermal runaway that may cause short-circuiting.

The multilayer ceramic electronic component according to one or more embodiments of the present disclosure will now be described with reference to the drawings. Although a multilayer ceramic capacitor will be described as an example of the multilayer ceramic electronic component, in one or more embodiments of the present disclosure, the multilayer ceramic electronic component may be a multilayer piezoelectric element, a multilayer thermistor element, a multilayer chip coil, or a ceramic multilayer substrate. The drawings referred to below are schematic and may not be drawn to scale relative to, for example, the actual dimensional ratios. For convenience, the orthogonal XYZ coordinate system may be defined herein. The X-direction may be referred to as a first direction. The Y-direction may be referred to as a second direction. The Z-direction may be referred to as a third direction.

Figure 1:
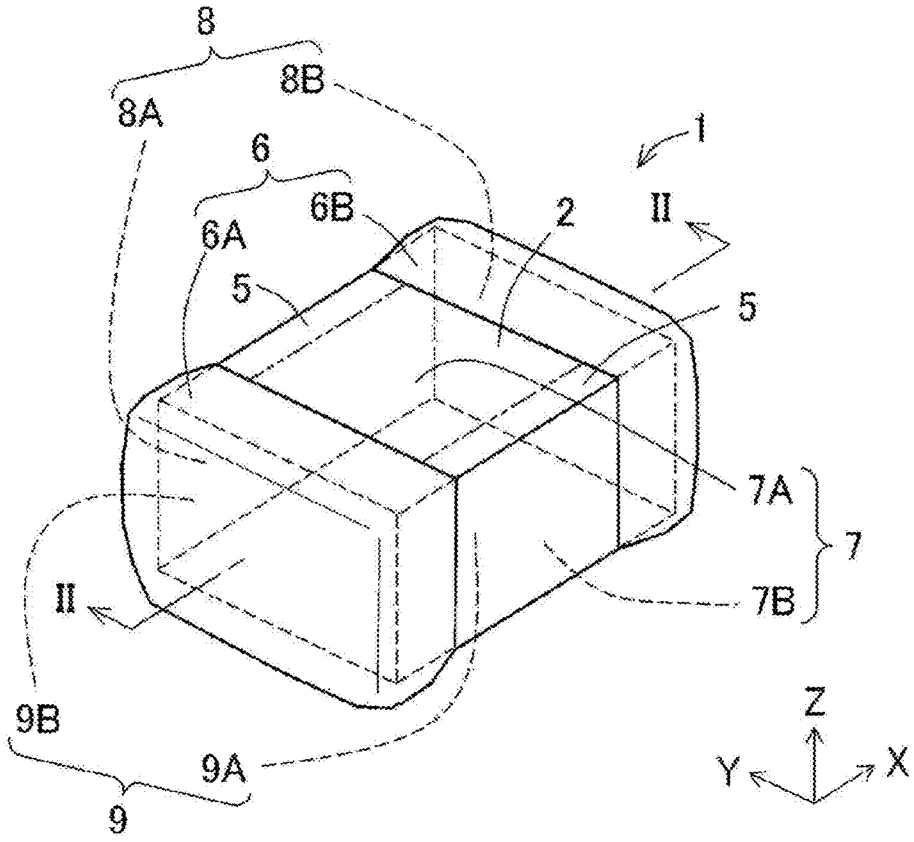
FIG. 1 is a perspective view of a multilayer ceramic electronic component according to an embodiment of the present disclosure.
Figure 2:
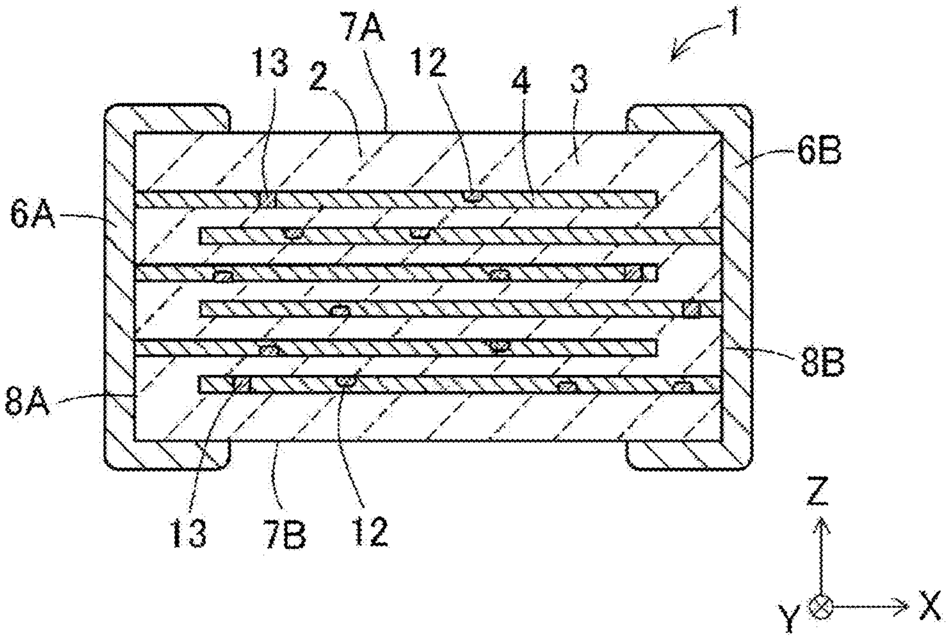
FIG. 2 is a cross-sectional view taken along line II-II in FIG. 1.
Figure 3:
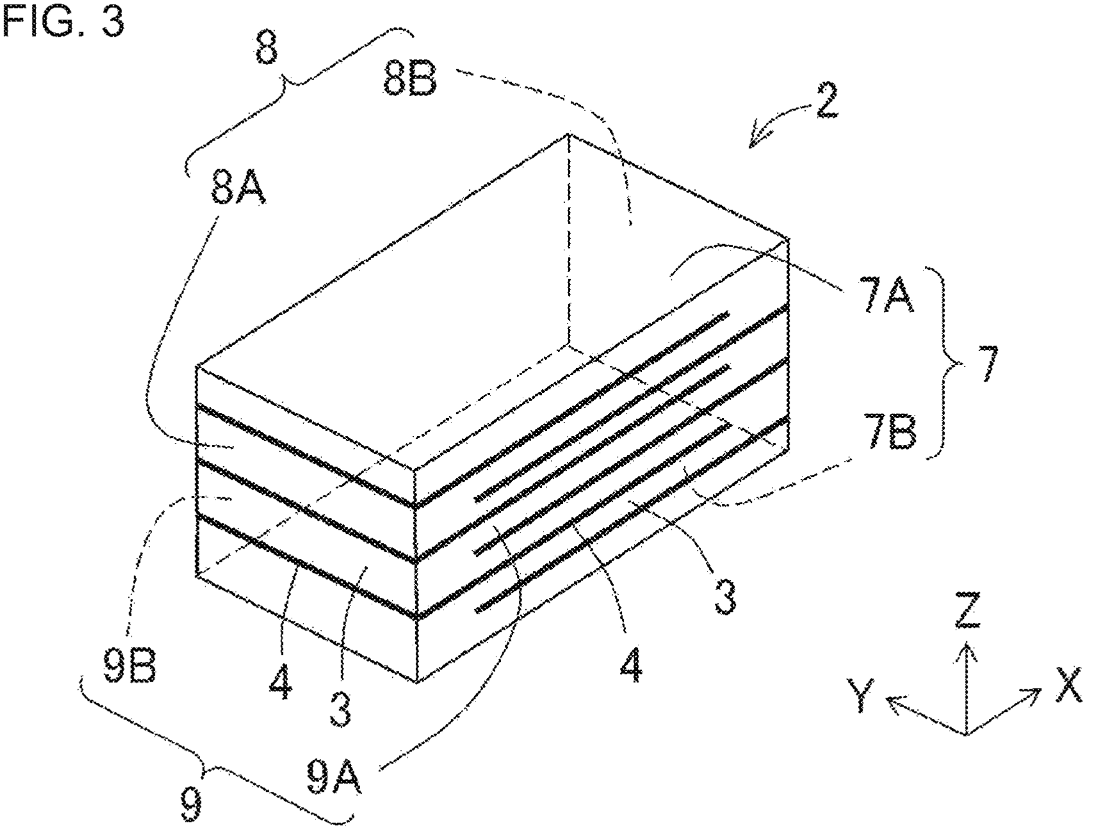
FIG. 3 is a perspective view of a stack for the multilayer ceramic electronic component according to the embodiment of the present disclosure.
Figure 4:
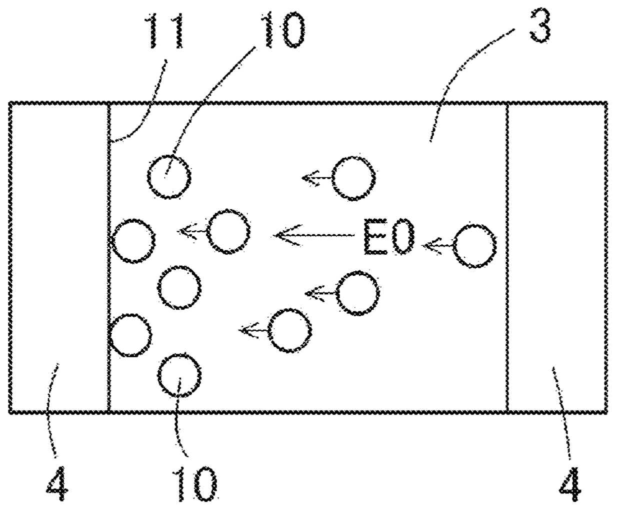
FIG. 4 is a diagram describing an increase in a leakage current in the multilayer ceramic electronic component according to the embodiment of the present disclosure.
Figure 5:
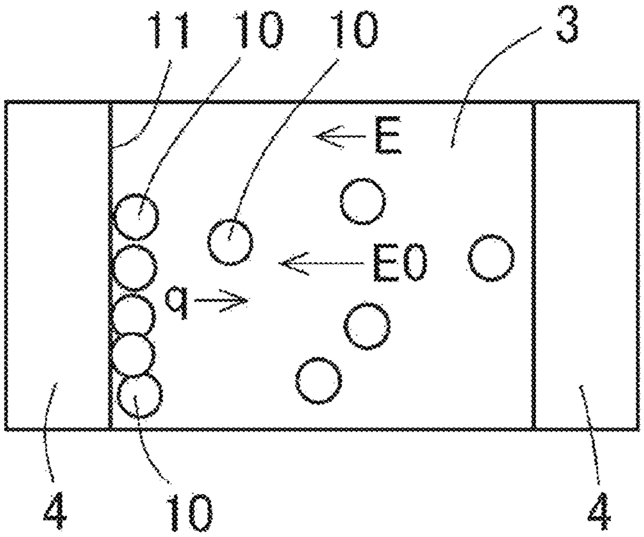
FIG. 5 is a diagram describing generation of a depolarization field in the multilayer ceramic electronic component according to the embodiment of the present disclosure.

FIG. 1 is a perspective view of a multilayer ceramic electronic component according to an embodiment of the present disclosure. FIG. 2 is a cross-sectional view taken along line II-II in FIG. 1. FIG. 3 is a perspective view of a stack for the multilayer ceramic electronic component according to the embodiment of the present disclosure. FIG. 4 is a diagram describing an increase in a leakage current in the multilayer ceramic electronic component according to the embodiment of the present disclosure. FIG. 5 is a diagram describing generation of a depolarization field in the multilayer ceramic electronic component according to the embodiment of the present disclosure.

In the present embodiment, as illustrated in FIG. 1, a multilayer ceramic capacitor 1 includes a stack 2. As illustrated in FIGS. 2 and 3, the stack 2 includes dielectric layers 3 and internal electrode layers 4 that are alternately stacked on one another in the third direction.

As illustrated in FIG. 3, the stack 2 is a substantially rectangular prism. The stack 2 includes a first surface 7A and a second surface 7B facing each other in the third direction. The stack 2 includes a first end face 8A and a second end face 8B facing each other in the first direction, and a first side surface 9A and a second side surface 9B facing each other in the second direction. The first surface 7A and the second surface 7B may be collectively referred to as main surfaces 7. The first end face 8A and the second end face 8B may be collectively referred to as end faces 8. The first side surface 9A and the second side surface 9B may be collectively referred to as side surfaces 9.

The dielectric layers 3 include a ceramic material. The ceramic material used for the dielectric layers 3 may include, for example, $BaTiO_3$ (barium titanate), $CaTiO_3$ (calcium titanate), $SrTiO_3$ (strontium titanate), or $BaZrO_3$ (barium zirconate).

Thinner dielectric layers 3 increase the capacitance of the multilayer ceramic capacitor 1. Each dielectric layer 3 may have a thickness of, for example, about 0.5 to 5.0 m.

The internal electrode layers 4 include a conductive material. The conductive material used for the internal electrode layers 4 may include, for example, a metal material such as Ni (nickel), Cu (copper), Ag (silver), Sn (tin), Pt (platinum), Pd (palladium), or Au (gold), or an alloy containing any of these metal materials.

As illustrated in FIG. 3, the internal electrode layers 4 are exposed on the first side surface 9A and the second side surface 9B. The internal electrode layers 4 with one polarity are exposed on one of the first end face 8A or the second end face 8B, and the internal electrode layers 4 with the other polarity are exposed on the other of the first end face 8A or the second end face 8B.

The internal electrode layers 4 with a smaller thickness that allow the capacitor to function reduce internal defects caused by internal stress, improving the reliability of the multilayer ceramic capacitor 1. The internal electrode layers 4 may each have a thickness of, for example, about 0.4 to 1.0 μm.

The multilayer ceramic capacitor 1 includes the dielectric layers 3 with $1.1\times10^{14}$ to $6.1\times10^{14}$ oxygen vacancies/$mm^3$ inclusive (hereafter also referred to as the oxygen vacancy concentration or the oxygen vacancy density). This amount of oxygen vacancies is achieved by adjusting the firing temperature and the firing atmosphere in the manufacturing processes. In other words, the dielectric layers 3 are semiconducting. Under a high temperature load, each dielectric layer 3 can have the oxygen vacancies migrating toward an internal electrode layer 4 that serves as the cathode in the pair of internal electrode layers 4 sandwiching the dielectric layer 3. This changes the energy barrier on an interface 11 between the dielectric layer 3 and the internal electrode layer 4 through band bending resulting from oxygen vacancies accumulating near the interface 11. This increases the probability for electrons in the metal contained in the internal electrode layer 4 to transition to the conduction band of the dielectric layer 3, thus increasing the likelihood of a leakage current. The dielectric layers 3 have heat conduction including heat conduction from carrier migration (leakage current) and heat conduction from lattice vibration. An increase in carrier migration (leakage current) in the dielectric layers 3 thus improves the heat conductivity (specifically, heat dissipation) of the dielectric layers 3. Thus, although the temperature rises in parts of the dielectric layers 3, the generated heat can be dissipated to the surrounding areas, thus reducing the likelihood of short-circuiting from thermal runaway. The multilayer ceramic capacitor 1 includes the dielectric layers 3 with $1.1\times10^{14}$ to $6.1\times10^{14}$ oxygen vacancies/$mm^3$ inclusive. This reduces the likelihood of short-circuiting from thermal runaway, although the insulation resistance may decrease.

The increase in the conductivity of the dielectric layers 3 also increases the amount of heat generation. However, the $1.1\times10^{14}$ to $6.1\times10^{14}$ oxygen vacancies/$mm^3$ inclusive in the dielectric layers 3 causes the amount of heat dissipation to exceed the amount of heat generation. The multilayer ceramic capacitor 1 can reduce the likelihood of short-circuiting from thermal runaway, although the insulation resistance may decrease.

In the multilayer ceramic capacitor 1, the electric field produced in the dielectric layer 3 is weakened by the charge of oxygen vacancies 10 accumulating near the interfaces 11 between the dielectric layers 3 and the internal electrode layers 4 as the cathode. In other words, an electric field q (hereafter also referred to as a depolarization field) is produced in each dielectric layer 3. The electric field q has the opposite direction to an electric field E0 resulting from a difference in the potential applied to the pair of internal electrode layers 4 sandwiching the dielectric layer 3. The amount of heat generation Q (Joule heat) per unit time in the dielectric layers 3 is denoted by $\sigma E^2$ where E is the magnitude of the electric field in the dielectric layers 3 and σ is the electric conductivity of the dielectric layers 3. When the electric field in the dielectric layers 3 is weakened, the amount of heat generation Q in the dielectric layers 3 decreases. The multilayer ceramic capacitor 1 reduces the amount of heat generation Q in the dielectric layers 3 using the depolarization field q, and thus reduces the likelihood of short-circuiting from thermal runaway. The contribution of the electric conductivity σ to the amount of heat generation Q is smaller than the contribution of the electric field E to the amount of heat generation Q. The amount of heat generation Q thus substantially depends on the electric field E alone.

As illustrated in FIG. 2, the multilayer ceramic capacitor 1 may include oxide phases 12 in the interfaces 11 between the dielectric layers 3 and the internal electrode layers 4. The oxide phases 12 are oxidized surface portions of the internal electrode layers 4. This structure can reduce the likelihood of lower adhesion between the dielectric layers 3 and the internal electrode layers 4, and thus can reduce the likelihood of lower insulation resistance in a thermal impact test and in a moisture load test. This improves the reliability of the multilayer ceramic capacitor 1.

As illustrated in FIG. 2, the multilayer ceramic capacitor 1 may include oxide phases 13 that are oxidized portions of the internal electrode layers 4. Each oxide phase 13 extends through an internal electrode layer 4 in the thickness direction. This structure has a chemical bond between the oxide phase 13 extending through the internal electrode layer 4 and the pairs of dielectric layers 3 sandwiching the internal electrode layer 4, thus increasing the bonding strength between the dielectric layers 3 and the internal electrode layer 4. This effectively reduces the likelihood of lower adhesion between the dielectric layers 3 and the internal electrode layers 4, effectively reducing the likelihood of damage in a thermal impact test and decrease in the insulation resistance in a humidity load test. This further improves the reliability of the multilayer ceramic capacitor 1.

As illustrated in FIG. 1, the multilayer ceramic capacitor 1 may include protective layers 5. One of the protective layers 5 may be located on the first side surface 9A and cover the internal electrode layers 4 exposed on the first side surface 9A. Another of the protective layers 5 may be located on the second side surface 9B and cover the internal electrode layers 4 exposed on the second side surface 9B. The multilayer ceramic capacitor 1 including the protective layers 5 can physically protect the internal electrode layers 4 exposed on the side surfaces 9. This structure also reduces the likelihood of short-circuiting between the internal electrode layers 4 with different polarities exposed on the side surfaces 9.

The protective layers 5 may include, for example, a ceramic material such as $BaTiO_3$, $CaTiO_3$, $SrTiO_3$, or $BaZrO_3$. The protective layers 5 may include the same ceramic material as the dielectric layers 3. In this case, the stack 2 and the protective layers 5 can be fired together.

Thinner protective layers 5 can reduce insulating margins that do not contribute to the capacitance achievable by the multilayer ceramic capacitor. The multilayer ceramic capacitor can thus be smaller and have larger capacity. Each protective layer 5 may have a thickness of, for example, about 25 to 120 μm.

As illustrated in FIG. 1, the multilayer ceramic capacitor 1 may include external electrodes 6 for external electrical connection. The external electrodes 6 include a first external electrode 6A and a second external electrode 6B. The first external electrode 6A may be located on the first end face 8A and electrically connected to the internal electrode layers 4 exposed on the first end face 8A. The second external electrode 6B may be located on the second end face 8B and electrically connected to the internal electrode layers 4 exposed on the second end face 8B.

The external electrodes 6 may extend to the first surface 7A and the second surface 7B. The first external electrode 6A may extend to the first side surface 9A and the second side surface 9B to cover portions of the protective layers 5 adjacent to the first end face 8A. The second external electrode 6B may extend to the first side surface 9A and the second side surface 9B to cover portions of the protective layer 5 adjacent to the second end face 8B. The first external electrode 6A and the second external electrode 6B are electrically insulated from each other.

Each external electrode 6 may include an underlayer connected to the stack 2, and a plated outer layer. The external electrodes 6 including the plated outer layer facilitate mounting on an external device using a conductive bond, such as solder. The underlayer may be applied, by thermal treatment, to the stack 2 after firing or may be applied to the stack 2 before firing and then fired together with the stack 2. The underlayer may be plated directly. The underlayer and the plated outer layer may each be single-layered or multilayered. The underlayer and the plated outer layer may include, for example, a metal material such as Ni, Cu, Ag, Pd, or Au, or an alloy containing any of these metal materials.

The multilayer ceramic capacitor 1 can be manufactured with, for example, the method described below.

First, a ceramic powder containing $BaTiO_3$ as a main component is prepared as the material for the dielectric layers 3, and an organic vehicle is added to the prepared ceramic powder to prepare ceramic slurry. The main components herein refer to the components with the highest concentration (mol %) in, for example, a material or a member to be used. The organic vehicle is obtained by dissolving a binder in an organic solvent. The binder may be, for example, ethyl cellulose or polyvinyl butyral. The organic solvent may be, for example, terpineol, butyl carbitol, acetone, or toluene. A ceramic green sheet is then manufactured with the prepared ceramic slurry. The ceramic green sheet may be manufactured by, for example, a sheet forming method such as doctor blading or die coating.

A conductive paste is then prepared using a metal powder containing Ni as a main component to be the internal electrode layers 4. The prepared conductive paste is then used to manufacture a patterned sheet with the electrode patterns to be the internal electrode layers 4 printed on the main surface of the ceramic green sheet. The electrode patterns may be printed by, for example, screen printing or gravure printing.

A predetermined number of patterned sheets are then stacked on one another to manufacture a precursor for the stack 2 (hereafter also referred to as a stack precursor). The stack precursor is then pressed in the stacking direction to cause the patterned sheets to adhere to one another. The precursor may be pressed with, for example, a hydrostatic press device. The protective layers 5 may be formed by bonding a ceramic green sheet to be the protective layers 5 to the side surfaces 9 of the stack precursor, or applying ceramic slurry to be the protective layers 5 and drying the ceramic slurry. The stack precursor is then degreased in an ambient atmosphere, an inert gas atmosphere, or a reducing atmosphere. The degreased stack precursor is then fired in a reducing atmosphere (hereafter also referred to as atmosphere firing). The firing temperature for the atmosphere firing may be, for example, about 1100 to 1300° C.

The stack precursor is then oxidized in a nitrogen atmosphere to manufacture the stack 2. The stack precursor before oxidation incudes more than $6.1\times10^{14}$ oxygen vacancies/mm$^3$ remaining in the dielectric layers 3. To increase insulation, the dielectric layers 3 are processed to include fewer oxygen vacancies. To manufacture the multilayer ceramic capacitor 1, the temperature in the oxidation process is maintained relatively high (e.g., 800 to 1000° C.), but the oxygen atmosphere during the oxidation process is adjusted to reduce the oxygen concentration to cause $1.1\times10^{14}$ to $6.1\times10^{14}$ oxygen vacancies 10/mm$^3$ inclusive to remain in the dielectric layers 3.

In the oxidation process, the oxygen vacancies in the dielectric layers 3 are reduced, and at least the surface portions of the internal electrode layers 4 are oxidized. The oxidation of the internal electrode layers 4 is controlled by the equilibrium oxygen partial pressure $pO_2$ generated by the chemical equilibrium of the gas atmosphere. The equilibrium oxygen partial pressure $pO_2$ of the gas atmosphere is determined by the partial pressure (concentration) of $H_2$ and $H_2O$ in the gas. The equilibrium oxygen partial pressure $pO_2$ is lower as the ratio $H_2/H_2O$ between $H_2$ and $H_2O$ is greater. With this manufacturing method, the temperature of the oxidation process is set at about 800 to 1000° C., and the equilibrium oxygen partial pressure $pO_2$ is set at about $10^{-8}$ to $10^{-12}$ atm to set $1.1\times10^{14}$ to $6.1\times10^{14}$ oxygen vacancies/mm$^3$ inclusive in the dielectric layers 3 and cause at least the surface portions of the internal electrode layers 4 to be oxidized.

To reduce the oxygen vacancies in the dielectric layers 3 alone, the oxidation may be performed in an atmosphere with high oxygen partial pressure. For a thin multilayer ceramic capacitor, however, the increased thermal conductivity is unsuitable to dissipate heat, and the depolarization field is less likely to reduce heat generation. Thus, short-circuiting can easily result from thermal runaway. Although the oxidation process is performed at a lower temperature to reduce the oxygen vacancies during the oxidation process, the surface portions of the internal electrode layers 4 may not be oxidized sufficiently. The dielectric layers 3 and the internal electrode layers 4 may thus easily have lower adhesion strength.

The external electrodes 6 are formed on the oxidized stack 2 to complete the multilayer ceramic capacitor 1 illustrated in FIG. 1.

WORKING EXAMPLES

The multilayer ceramic capacitors (samples 4 to 6 in Table 1) according to working examples were manufactured. As the material for the dielectric layers 3 and the protective layers 5, $BaTiO^3$ was used. As the material for the internal electrode layers 4 and the external electrodes 6, Ni was used. The dielectric layers 3 with a thickness of 0.95 μm, the internal electrode layers 4 with a thickness of 0.55 μm, and 460 patterned sheets were used. The stack 2 with a dimension of 1680 μm in the first direction, 825 μm in the second direction, and 830 μm in the third direction was used. The protective layers 5 with a thickness of 70 μm was used. The external electrodes 6 have the shapes illustrated in FIG. 1. As shown in Table 1, samples 4 to 6 have different oxidation process conditions to produce different amounts of oxygen vacancies in the dielectric layers 3.

The capacitors in comparative examples (samples 1 to 3 and 7 in Table 1) were multilayer ceramic capacitors manufactured under the same or similar conditions as in the working examples except that the conditions of the oxidization process were different from the conditions in the working examples. In samples 1 to 3 and 7, each dielectric layer 3 includes fewer than $1.1\times10^{14}$ or more than $6.1\times10^{14}$ oxygen vacancies/mm$^3$.

The amount of oxygen vacancies in the dielectric layers 3 can be calculated with, for example, the method described below. The multilayer ceramic capacitor (hereafter also referred to as a sample) is polarized under a predetermined polarization condition. The polarization condition may be, for example, a voltage of 6 V applied for 60 minutes at 200° C. Polarization conditions can be any conditions under which the thermally stimulated depolarization current (TSDC) saturates in time. The polarization conditions, particularly the applied voltage and time, can be different for each sample. After being polarized, the multilayer ceramic capacitor is cooled to room temperature with a voltage of 6 V applied, and then the internal electrode layers 4 with different polarities were short-circuited for 10 minutes. The temperature of the multilayer ceramic capacitor is then elevated from room temperature to 340° C. at the heating rate of 5° C. per minute. The TSDC is measured using a microcurrent meter. The amount of charge of oxygen vacancies is calculated based on the area of the peak portion of TSDC corresponding to the migration of oxygen vacancies and the rate of temperature increase. The amount of oxygen vacancies (vacancies/$mm^3$) can be obtained by dividing the amount of charge of the oxygen vacancies by the product of the valence of the oxygen vacancies and the electric elementary quantity, and dividing the resultant by the volume of dielectric layer 3 determined from the dimensions of the stack 2.

The multilayer ceramic capacitors in the working examples and the comparative examples underwent thermal impact tests and a high-temperature load test to evaluate their reliability. Table 1 shows the evaluation results.

The multilayer ceramic capacitors in the working examples (samples 4 to 6) did not have short-circuiting from thermal runaway in the high-temperature load test although cracks occurred in the thermal impact test. In the multilayer ceramic capacitor in each working example, the dielectric layers 3 include $1.1\times10^{14}$ to $6.1\times10^{14}$ oxygen vacancies/$mm^3$ to reduce thermal runaway in high-temperature load tests and reduce the likelihood of short-circuiting. In the working examples, the multilayer ceramic capacitors include the internal electrode layers 4 with the surface portions oxidized to increase adhesion (in other words, resistance to thermal impact) between the dielectric layers 3 and the internal electrode layers 4.

The multilayer ceramic capacitor in sample 1 included fewer oxygen vacancies and a small increase in a leakage current over time, but had short-circuiting in the high-temperature load test. Sample 2 underwent the oxidation process at a lower temperature than sample 1, and included more oxygen vacancies than sample 1. Sample 2 had insufficient oxidation of the internal electrode layers 4, with low adhesion between the dielectric layers 3 and the internal electrode layers 4, thus being a defective product in the thermal impact test. Sample 2 showed a greater increase in a leakage current over time than sample 1, but was not sufficient to reduce the likelihood of short-circuiting. With the equilibrium oxygen partial pressure $pO^2$ in the oxidation process reduced to weaken the oxidation performance of the gas atmosphere, the sample 3 included more oxygen vacancies than samples 1 and 2, but had short-circuit in the high-temperature load test. Sample 7 included more oxygen vacancies than samples 4 to 6 by decreasing the oxygen partial pressure of the oxidation process and weakening the oxidation performance of the gas atmosphere. In the high-temperature load test, sample 7 included the dielectric layers 3 with too low resistance, and thus did not undergo a conduction test. In the thermal impact test, sample 7 showed that the gas atmosphere had too low oxidation performance and had defective adhesion between the dielectric layers 3 and the internal electrode layers 4.

TABLE 1

| Sample | Oxidation Temperature (° C.) | Oxidation $H_2/H_2O$ | Oxidation Oxygen partial pressure (atm) | Oxygen vacancies (vacancies/$mm^3$) | Thermal impact test | High-temperature load test |
|---|---|---|---|---|---|---|
| 1 | 1000 | 0 | $2.0 \times 10^{-5}$ | $4.0 \times 10^{12}$ | 0/100 | 14/100 |
| 2 | 600 | 0 | $2.0 \times 10^{-5}$ | $2.5 \times 10^{13}$ | 7/100 | 18/100 |
| 3 | 1000 | 1/20000 | $1.5 \times 10^{-6}$ | $6.5 \times 10^{13}$ | 0/100 | 5/100 |
| 4 | 1000 | 1/2000 | $1.5 \times 10^{-8}$ | $1.1 \times 10^{14}$ | 0/100 | 0/100 |
| 5 | 800 | 1/20000 | $2.3 \times 10^{-10}$ | $3.1 \times 10^{14}$ | 0/100 | 0/100 |
| 6 | 800 | 1/2000 | $2.3 \times 10^{-12}$ | $6.1 \times 10^{14}$ | 1/100 | 0/100 |
| 7 | 800 | 1/20 | $2.3 \times 10^{-16}$ | $2.9 \times 10^{15}$ | 8/100 | |

In the thermal impact test, samples 1 to 7 were placed at room temperature (25° C.) in a solder bath maintained at a predetermined temperature (305° C.) and subjected to a thermal impact (ΔT=280° C.). The appearance of samples 1 to 7 were then observed with a stereoscopic microscope to inspect for cracks. For example, "7/100" for sample 2 in Table 1 means that cracks were observed in 7 out of 100 samples as a result of the thermal impact test. The same or similar manner applies to the others.

In the high-temperature load test, samples 1 to 7 were held in a thermostatic chamber and a voltage of 9.5 V was applied at a temperature of 140° C. The leakage current was then measured. Samples that had short-circuiting during the application of voltage were determined to be defective. For example, "18/100" for sample 2 in Table 1 means that 18 out of 100 samples had short-circuiting in the high-temperature load test. The same or similar manner applies to the others. Sample 7 with more than $6.1\times10^{14}$ oxygen vacancies/$mm^3$ did not undergo a conduction test because of its low insulation resistance.

As described above, the dielectric layers 3 in each working example with $1.1\times10^{14}$ to $6\times10^{14}$ oxygen vacancies/$mm^3$ inclusive reduce the likelihood of short-circuiting from thermal runaway. In the working examples, the surface portions of the internal electrode layers 4 are oxidized to increase the adhesion between the dielectric layers 3 and the internal electrode layers 4.

The multilayer ceramic electronic component according to one or more embodiments of the present disclosure may be implemented in forms 1 to 4 described below.

(1) A multilayer ceramic electronic component, comprising:

a stack including dielectric layers and internal electrode layers alternately stacked on one another, wherein the dielectric layers include $1.1\times10^{14}$ to $6.1\times10^{14}$ oxygen vacancies/$mm^3$ inclusive.

(2) The multilayer ceramic electronic component according to (1), further comprising: an oxide phase in an interface between each of the dielectric layers and an adjacent internal electrode layer of the internal electrode layers, the oxide phase being an oxidized surface portion of the adjacent internal electrode layer.

(3) The multilayer ceramic electronic component according to (1) or (2), wherein each of the dielectric layers has a thickness of 0.5 to 5.0 m inclusive.

(4) The multilayer ceramic electronic component according to any one of (1) to (3), wherein each of the dielectric layers includes Ba and Ti, and each of the internal electrode layers includes Ni.

In one or more embodiments of the present disclosure, the multilayer ceramic electronic component is less likely to have short-circuiting from thermal runaway in a high-temperature operation and can have high reliability.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS

1 multilayer ceramic electronic component (multilayer ceramic capacitor)
2 stack
3 dielectric layer
4 internal electrode layer
5 protective layer
6 external electrode
6A first external electrode
6B second external electrode
7 main surface
7A first surface
7B second surface
8 end face
8A first end face
8B second end face
9 side surface
9A first side surface
9B second side surface
10 oxygen vacancy
11 interface
12, 13 oxide phase

The invention claimed is:

1. A multilayer ceramic electronic component, comprising:

a stack including dielectric layers and internal electrode layers alternately stacked on one another, wherein the dielectric layers include $1.1\times10^{14}$ to $6.1\times10^{14}$ oxygen vacancies/$mm^3$ inclusive, wherein the oxygen vacancies are configured to accumulate near interfaces between the dielectric layers and the internal electrode layers to generate a depolarization field opposing an electric field applied across the dielectric layers, wherein the depolarization field reduces an electric field in the dielectric layers to reduce heat generation in the dielectric layers, and wherein carrier migration associated with the oxygen vacancies increases heat dissipation in the dielectric layers such that thermal runaway is suppressed.

2. The multilayer ceramic electronic component according to claim 1, further comprising:

an oxide phase in an interface between each of the dielectric layers and an adjacent internal electrode layer of the internal electrode layers, the oxide phase being an oxidized surface portion of the adjacent internal electrode layer.

3. The multilayer ceramic electronic component according to claim 1, wherein each of the dielectric layers has a thickness of 0.5 to 5.0 μm inclusive.

4. The multilayer ceramic electronic component according to claim 1, wherein each of the dielectric layers includes Ba and Ti, and each of the internal electrode layers includes Ni.

* * * * *